United States Patent
Takazawa (10) Patent No.: US 10,366,484 B2
(45) Date of Patent: Jul. 30, 2019

(54) INSPECTION METHOD, INSPECTION APPARATUS, PROCESSING APPARATUS, AND RECORDING MEDIUM FOR DETECTING DEFECTS OF A WORK

(71) Applicant: CANON KABUSHIKI KAISHA, Tokyo (JP)

(72) Inventor: Naokazu Takazawa, Sakai (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 15/185,565

(22) Filed: Jun. 17, 2016

(65) Prior Publication Data
US 2016/0379357 A1   Dec. 29, 2016

(30) Foreign Application Priority Data

Jun. 26, 2015   (JP) ................................ 2015-128713

(51) Int. Cl.
*H04N 7/18* (2006.01)
*G06T 7/00* (2017.01)
*B25J 9/16* (2006.01)

(52) U.S. Cl.
CPC ........... *G06T 7/0004* (2013.01); *B25J 9/1697* (2013.01); *H04N 7/18* (2013.01); *G06T 2200/04* (2013.01);
(Continued)

(58) Field of Classification Search
CPC ..... H04N 7/18; G06T 7/0004; G06T 2200/04; G06T 2207/10016; G06T 2207/30164
(Continued)

(56) References Cited

U.S. PATENT DOCUMENTS 5,237,404 A * 8/1993 Tanaka ................. G01B 11/303
                                                          348/128
5,379,347 A * 1/1995 Kato ................... G01N 21/9515
                                                          348/128
(Continued)

FOREIGN PATENT DOCUMENTS

JP    2001-088073 A    4/2001
JP    2005-031085 A    2/2005
(Continued)

OTHER PUBLICATIONS

Office Action dated May 31, 2019, issued in Japanese Patent Application No. 2015-128713.

*Primary Examiner* — Trang U Tran
(74) *Attorney, Agent, or Firm* — Venable LLP (57) ABSTRACT

A robot operates according to predetermined path data, and changes a relative position between a work and an imaging apparatus. A processing unit makes the imaging apparatus pick up an image of the work, while changing the relative position between the work and the imaging apparatus, and acquires a plurality of images. The processing unit determines the relative position between the work and the imaging apparatus, at the time when having made the imaging apparatus pick up the image of the work. The processing unit detects a defect of the work from each of the plurality of images acquired during moving by the moving apparatus according to the predetermined path data, and identifies a position of the defect in the work, based on the relative position between the work and the imaging apparatus that has been calculated.

20 Claims, 9 Drawing Sheets

(52) U.S. Cl.
CPC ............... *G06T 2207/10016* (2013.01); *G06T 2207/30164* (2013.01)

(58) Field of Classification Search
USPC .................................................. 348/86, 128
See application file for complete search history.

(56) References Cited

U.S. PATENT DOCUMENTS

| | | | |
|---|---|---|---|
| 5,706,408 A * | 1/1998 | Pryor | ..................... B25J 9/1692 700/259 |
| 6,167,151 A * | 12/2000 | Albeck | .............. G06K 9/00201 345/419 |
| 7,272,254 B2 | 9/2007 | Shankarappa et al. | |
| 7,639,349 B2 | 12/2009 | Ersue et al. | |
| 8,059,151 B2 | 11/2011 | Ersue et al. | |
| 8,797,398 B2 | 8/2014 | Drescher et al. | |
| 2011/0267451 A1 | 11/2011 | Drescher et al. | |

FOREIGN PATENT DOCUMENTS

| | | |
|---|---|---|
| JP | 2007-523333 A | 8/2007 |
| JP | 2007-527993 A | 10/2007 |
| JP | 2011-089826 A | 5/2011 |
| JP | 4827744 B2 | 11/2011 |
| JP | 2013-024852 A | 2/2013 |

\* cited by examiner

FIG. 9 ured. Because of this, the inspection apparatus cannot operate at a high speed, and has had a problem that an inspection cycle time increases in order that the defect is associated with the position on the work.
INSPECTION METHOD, INSPECTION APPARATUS, PROCESSING APPARATUS, AND RECORDING MEDIUM FOR DETECTING DEFECTS OF A WORK This application claims the benefit of Japanese Patent Application No. 2015-128713, filed Jun. 26, 2015, which is hereby incorporated by reference herein in its entirety.

BACKGROUND OF THE INVENTION

Field of the Invention

The present invention relates to an inspection method that picks up an image of a work while changing a relative position between the work and an imaging apparatus, and inspects the work, an inspection apparatus, a processing apparatus, and a recording medium.

Description of the Related Art

An inspection apparatus is known that picks up an image of a work, such as a product, in a production process by using an imaging apparatus that is represented by a camera, and inspects the work based on the picked-up image.

In such an inspection apparatus, an inspection apparatus for inspecting works that are represented by an exterior component of a product and have various shapes includes an inspection apparatus that picks up an image of the work while changing a relative position between the work and the imaging apparatus and a pose (hereafter referred to as a "position"). In order to inspect the work while changing the relative position between the work and the imaging apparatus and to inspect various works having various shapes, it is important that the inspection apparatus has a moving apparatus for moving both or either of the work and the imaging apparatus, and a processing apparatus that holds a three-dimensional shape of the work.

The inspection apparatus having such a structure relatively positions the work to the imaging apparatus so that the positions become inspecting positions that have been previously instructed before inspection, and makes the imaging apparatus pick up an image of the work (see Japanese Patent No. 4827744). For instance, the inspection apparatus positions the work on a work bench or the like, so that the work is positioned at a predetermined position and in a predetermined pose, moves the imaging apparatus, and makes the imaging apparatus pick up an image of the work. The inspection apparatus performs image processing for the image that has been picked up in such a state, and a system control apparatus associates the detected defect with the position on the work (see Japanese Patent Application Laid-Open No. 2005-31085).

In the inspection apparatus described in Japanese Patent No. 4827744, however, it is required that the relative position between the work and the imaging apparatus coincides with the previously instructed state. Because of this, when an error has occurred in the relative position between the work and the imaging apparatus, it is necessary for the inspection apparatus to correct an imaging position so that features of the picked-up image coincide with those of an image that is supposed when the image has been previously instructed, and to pick up the image again. When such a feedback operation has occurred, there has been a problem that a cycle time required for the inspection increases.

In addition, the inspection apparatus described in Japanese Patent Application Laid-Open No. 2005-31085 associates the detected defect with the position on the work, based on the previously instructed relative position between the work and the imaging apparatus, and accordingly, accurate positioning between the work and the imaging apparatus is required. Because of this, the inspection apparatus cannot operate at a high speed, and has had a problem that an inspection cycle time increases in order that the defect is associated with the position on the work.

Then, an object of the present invention is to increase a speed of an inspection of the work.

SUMMARY OF THE INVENTION

To achieve the above object, an aspect of the present invention provides an inspection method in which a processing unit controls imaging timing of an imaging apparatus that picks up an image of a work, controls an operation of a moving apparatus for moving at least one of the work and the imaging apparatus, and inspects the work based on an imaging result of the imaging apparatus. The inspection method comprises a moving process in which the processing unit makes the moving apparatus operate according to path data, and changes a relative position between the work and the imaging apparatus, an image acquiring process in which the processing unit makes the imaging apparatus pick up the image of the work, while changing the relative position between the work and the imaging apparatus in the moving process, and acquires a plurality of images, a position calculating process in which the processing unit determines the relative position between the work and the imaging apparatus, at the time when having made the imaging apparatus pick up the image of the work, and an identifying process in which the processing unit detects a defect of the work from each of the images, and identifies a position of the defect in the work, based on the relative position between the work and the imaging apparatus that has been calculated in the position calculating process.

The inspection method according to the present invention enables a high-speed inspection operation, and can accurately determine the position of the defect on the work. Therefore, the inspection method can accurately determine whether the work is a non-defective product or a defective product.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
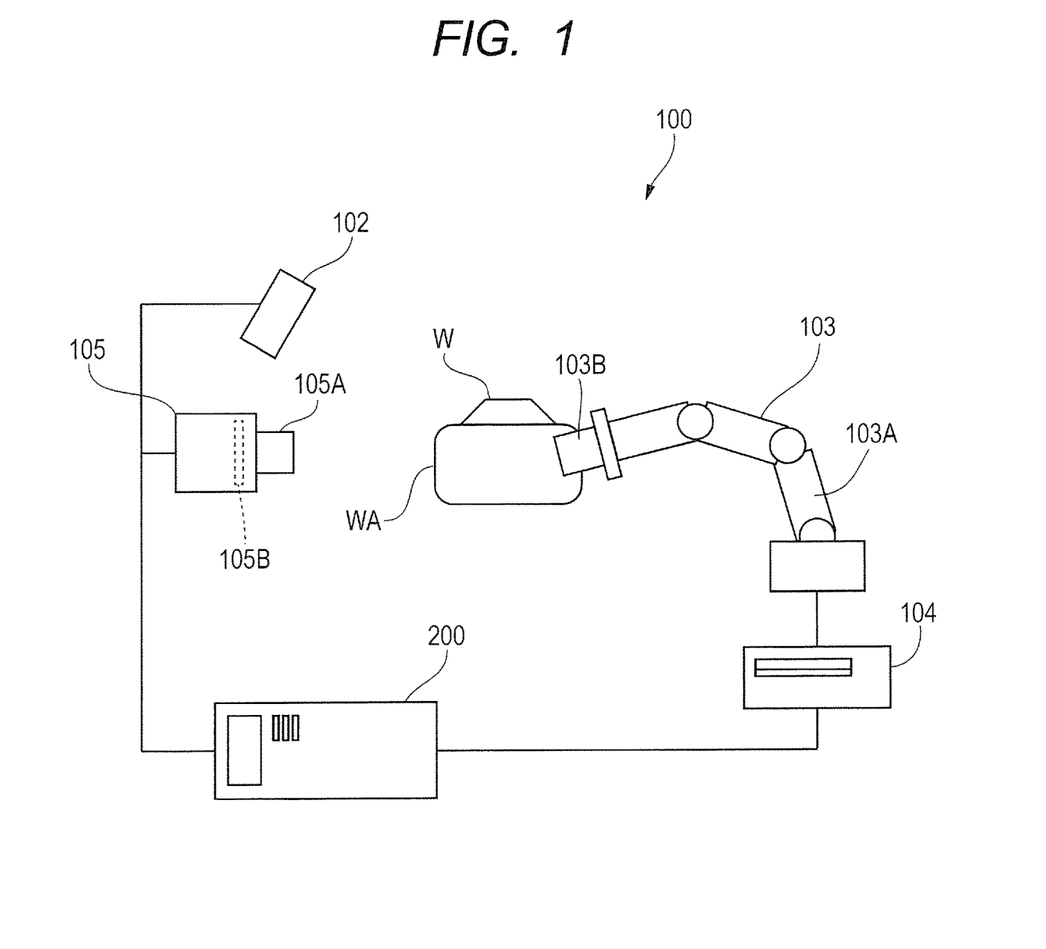
FIG. 1 is a schematic view illustrating an inspection apparatus according to a first embodiment.

FIG. 1 is a schematic view illustrating an inspection apparatus according to a first embodiment of the present invention. An inspection apparatus 100 is an apparatus for inspecting an appearance of a work (inspection object) W. The inspection apparatus 100 includes: a light source 102; and a robot 103 that is a moving apparatus that moves the work W. The inspection apparatus 100 also includes: a controlling apparatus (controlling unit) 104 that controls an operation of the robot 103; a camera 105 that acts as an imaging apparatus; and an image processing apparatus 200 that is a processing apparatus (processing unit). The robot 103 is connected to the controlling apparatus 104, and all of the controlling apparatus 104, the camera 105 and the light source 102 are connected to the image processing apparatus 200.

The light source 102 is an illumination apparatus that irradiates (illuminates) the work W with light. The light source 102 may be any light source, as long as the light source irradiates the work W with light having a light quantity necessary for image processing, for instance, an LED or a halogen lamp, and may also be any illumination, such as ring illumination or bar illumination. In addition, a diffuser panel, a lens, and the like may be arranged on a light-emitting surface side of the light source 102.

The robot 103 is a multi-joint robot, and has a robot arm 103A, and a robot hand 103B which is attached on the robot arm 103A. The robot arm 103A is a vertical multi-joint robot arm, in the first embodiment. The robot hand 103B has a plurality of fingers, and grasps the work W or releases the grasping by an opening/closing operation of these fingers.

A base end (fixed end) of the robot arm 103A is fixed to an unillustrated structure, such as a trestle, and on the other end (free end) thereof, the robot hand 103B is attached to the robot arm 103A. The robot hand 103B grasps the work W, and the robot arm 103A operates, in other words, changes the pose of the robot 103, and thereby can change the position and the pose (hereinafter referred to as "position") of the work W. In other words, the work W can be grasped and moved by the robot 103.

The camera 105 is a digital camera that receives light from the work W and generates data of a picked-up image. The camera 105 has an imaging lens 105A, and an imaging device (solid imaging device) 105B.

The imaging device 105B is an area sensor, such as a CMOS image sensor or a CCD image sensor. The imaging lens 105A is an objective lens unit that adjusts magnification, and adjusts the magnification so that the whole work W is imaged on an imaging device 105B.

The image processing apparatus 200 performs image processing for the picked-up image that has been imaged by the camera 105, and inspects the work W.

The light source 102 may be fixed or moved with respect to the camera 105, but in the first embodiment, the camera 105 and the light source 102 are fixed to the trestle and other structures, and the relative position (including the pose) between the camera 105 and the light source 102 is fixed.

In addition, the relative position (including the pose) between the work W and the camera 105 is changed. In the first embodiment, the robot 103 moves the work W, and thereby changes the relative imaging position of the camera 105 with respect to the work W. In other words, the camera 105, which is an imaging apparatus that acquires an image for inspection, and the light source 102 are installed independently from the work W.

Incidentally, in the first embodiment, the case will be described below in which the moving apparatus is the robot 103, but the moving apparatus is not limited to the robot, and may be an apparatus other than the robot (for instance, a stage apparatus). In addition, the case will be described below in which the work W is moved with respect to the camera 105, but the camera 105 may be moved with respect to the work W. In other words, the positions of the camera 105 and the work W may be relatively changed, and accordingly, the camera 105 may be moved, for instance, with the use of the robot 103. In addition, the case is also acceptable in which the moving apparatus moves both of the camera 105 and the work W. In any case, the relative imaging position of the camera 105 with respect to the work W can be changed.

Figure 2:
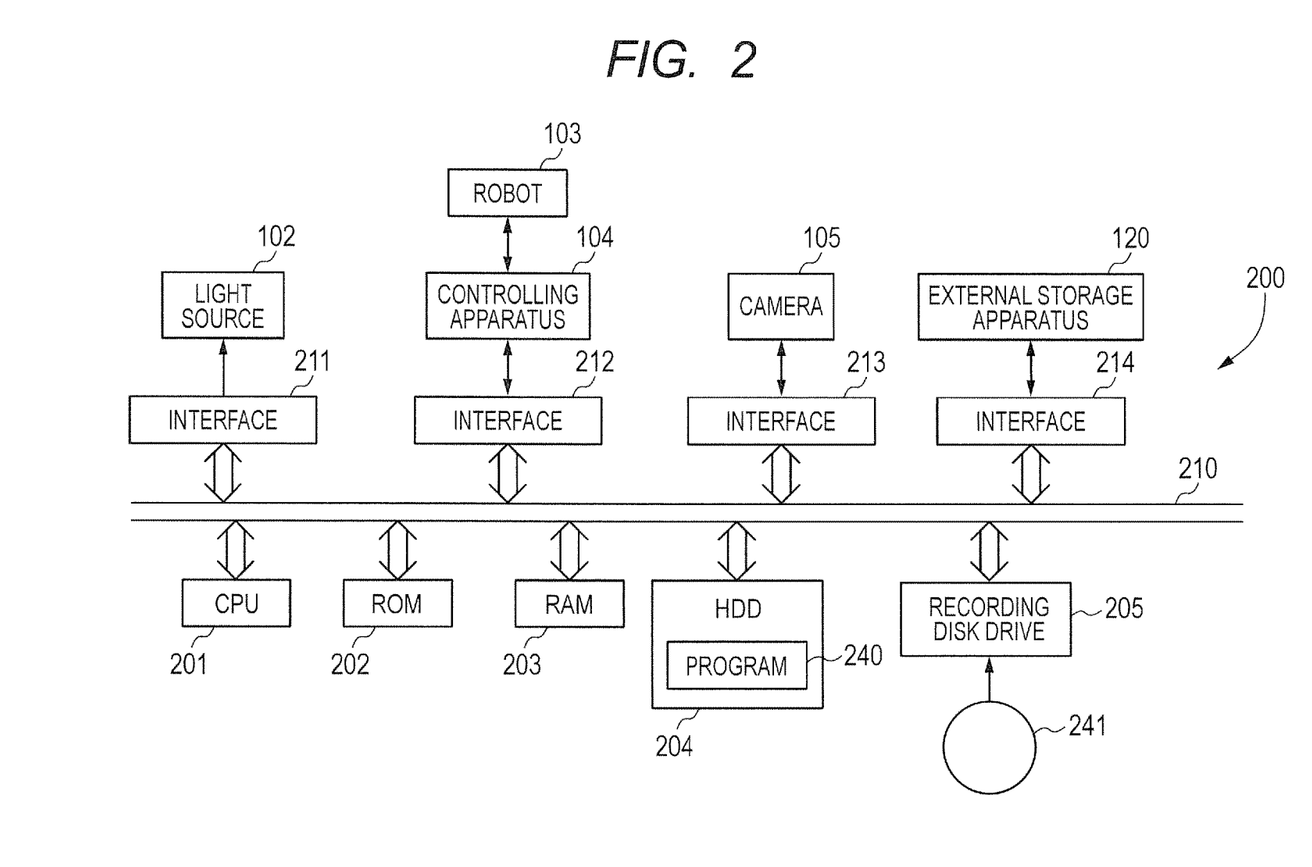
FIG. 2 is a block diagram illustrating an image processing apparatus according to the first embodiment.

FIG. 2 is a block diagram illustrating an image processing apparatus according to the first embodiment of the present invention. An image processing apparatus 200 has a CPU (Central Processing Unit) 201 that acts as a processing unit (arithmetic operation unit). The image processing apparatus 200 also has a ROM (Read Only Memory) 202, a RAM (Random Access Memory) 203, and a HDD (Hard Disk Drive) 204, which act as storage units. The image processing apparatus 200 also has a recording disk drive 205, and various types of interfaces 211 to 214.

The ROM 202, the RAM 203, the HDD 204, the recording disk drive 205, and the various types of the interfaces 211 to 214 are connected to the CPU 201 through a bus 210. The ROM 202 stores a basic program, such as a BIOS, therein. The RAM 203 is a storage apparatus that temporarily stores various data, such as an arithmetic processing result of the CPU 201, therein.

The HDD 204 is a storage apparatus that stores the arithmetic processing result of the CPU 201, various data that has been acquired from the outside, and the like, therein, and also records a program 240 therein for making the CPU 201 execute various arithmetic processing that are described below. The CPU 201 executes each process in an inspection method, based on the program 240 that is recorded (stored) in the HDD 204.

The recording disk drive 205 can read out various data, a program, and the like, that are recorded in a recording disk 241.

The light source 102 is connected to the interface 211, and is turned on or turned off under the control of the CPU 201.

The controlling apparatus 104 of the robot 103 is connected to the interface 212, receives path data of the robot 103 from the CPU 201, and controls the operation of the robot 103 that grasps the work W, according to the path data.

The camera 105 is connected to the interface 213. The CPU 201 outputs a trigger signal to the camera 105, and makes the camera 105 pick up the image at the timing at which the camera 105 has received the trigger signal. The camera 105 outputs the data of the picked-up image that is an imaging result, to the CPU 201. The CPU 201 acquires data of the picked-up image from the camera 105, subjects the picked-up image to image processing, and inspects the work W. In the first embodiment, the CPU 201 detects a defect, such as a flaw and dirt of the work W, and identifies a position of the defect on the work W, as the inspection of the work W.

An external storage apparatus 120, such as a rewritable nonvolatile memory or an external HDD, can be connected to the interface 214.

According to the above-described configuration, the CPU 201 of the image processing apparatus 200 controls the imaging timing of the camera 105 that picks up an image of the work W, and controls the operation of the robot 103 that moves the work W. In addition, the CPU 201 inspects the work W based on the imaging result of the camera 105.

Incidentally, in the first embodiment, the case will be described below in which a recording medium that can be read by a computer is the HDD 204, and the program 240 is stored in the HDD 204, but the invention is not limited to the above case. The program 240 may be recorded in any recording medium as long as the recording medium can be read by the computer. For instance, the ROM 202, the recording disk 241, and the external storage apparatus 120 that are illustrated in FIG. 2, and the like, may be used as the recording medium for supplying the program 240. Specific usable examples of the recording medium include a flexible disk, a hard disk, an optical disk, a magneto-optical disk, a CD-ROM, a CD-R, a magnetic tape, a nonvolatile memory, and a ROM.

Figure 3:
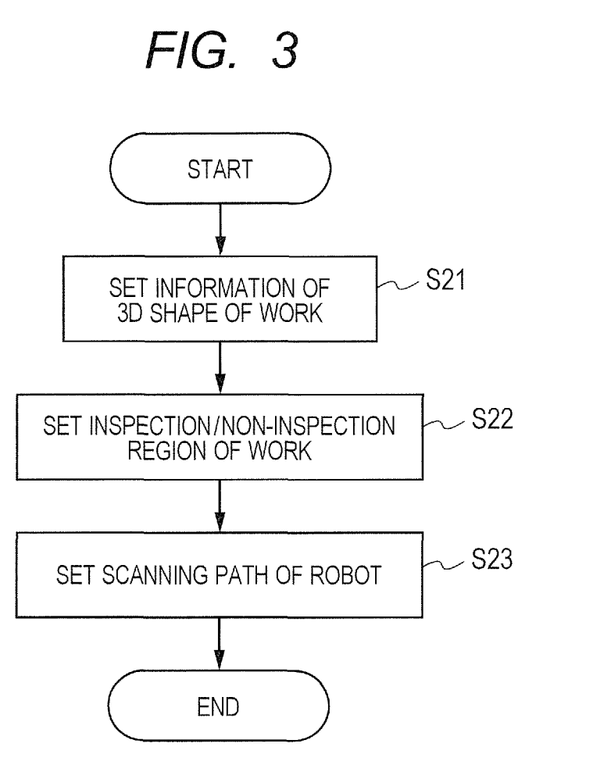
FIG. 3 is a flow chart illustrating an inspection preparation process that is performed before an inspection method according to the first embodiment.

FIG. 3 is a flow chart illustrating an inspection preparation process that is performed before the inspection method according to the first embodiment of the present invention.

Firstly, the CPU 201 sets three-dimensional shape information of the work W before the inspection of the work W is performed (S21). Three-dimensional CAD information, or the like, can be used as the three-dimensional shape information of the work W. The CPU 201 converts the three-dimensional shape information (three-dimensional shape model) of the work W into a CAD application format, or a more versatile STL format, and then makes a storage unit, such as the HDD 204 of the image processing apparatus 200, store the converted three-dimensional shape information of the work W, according to an instruction of a user.

Next, the CPU 201 sets an inspection region in which the inspection is actually performed based on the three-dimensional shape information of the work W, and a non-inspection region in which the inspection is not performed (S22), according to the instruction of the user. Specifically, the CPU 201 makes the storage unit, such as the HDD 204 of the image processing apparatus 200, store the inspection region and the non-inspection region (data) of the work W, which have been input into the CPU 201.

Figure 4A:
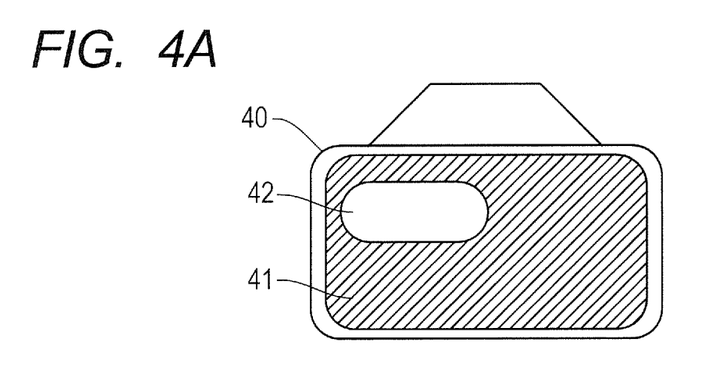
FIG. 4A is an explanatory view illustrating one example of an inspection region and a non-inspection region that have been set based on three-dimensional shape information of a work.
Figure 4B:
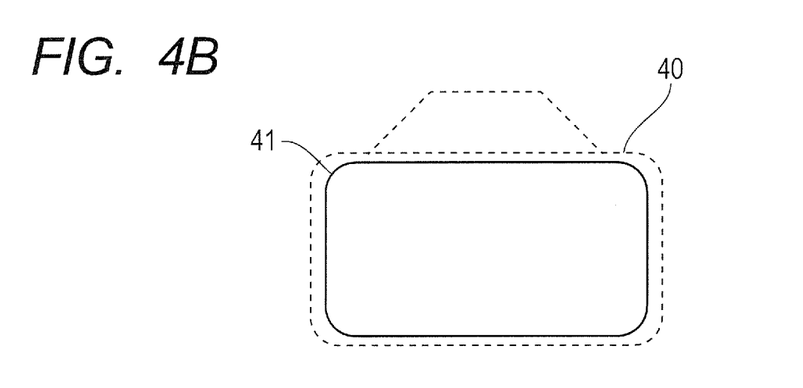
FIG. 4B is an explanatory view illustrating one example of the inspection region that has been set based on the three-dimensional shape information of the work.
Figure 4C:
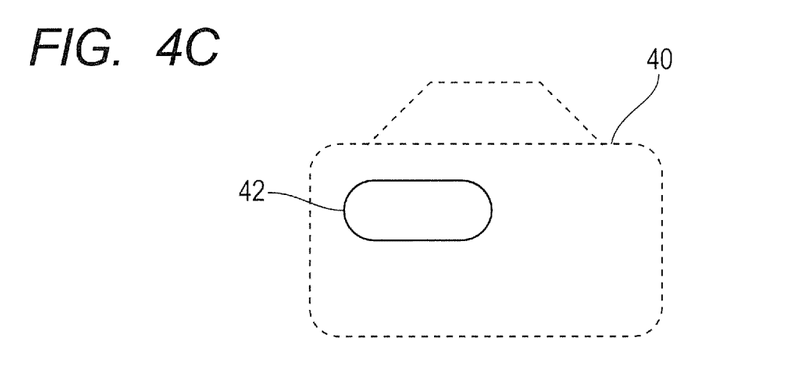
FIG. 4C is an explanatory view illustrating one example of a non-inspection region that has been set based on the three-dimensional shape information of the work.

FIG. 4A is an explanatory view illustrating one example of an inspection region and a non-inspection region that have been set based on three-dimensional shape information of the work W. FIG. 4B is an explanatory view illustrating one example of the inspection region that has been set based on the three-dimensional shape information of the work W. FIG. 4C is an explanatory view illustrating one example of the non-inspection region that has been set based on the three-dimensional shape information of the work W.

As is illustrated in FIG. 4A, the inspection region 41 and the non-inspection region 42 can be set as surface characteristics, based on the three-dimensional shape information (three-dimensional shape model) 40 of the work W. In addition, the CPU 201 can separately give the three-dimensional shape information 41 that shows the inspection region, as is illustrated in FIG. 4B, and the three-dimensional shape information 42 that shows the non-inspection region, as is illustrated in FIG. 4C, to the storage unit. When having separately given the inspection region and the non-inspection region, the CPU 201 separately sets which set region is preceded, and thereby can set even regions which overlap each other.

Incidentally, in the first embodiment, the case will be described below in which both of the inspection region and non-inspection region are set, but only the inspection region may be set. In this case, a region other than the inspection region shall be the non-inspection region.

Next, the CPU 201 sets a scanning path (path) of the robot 103, which corresponds to the work W (S23). Specifically, the CPU 201 makes the storage unit, such as the HDD 204 of the image processing apparatus 200, store the scanning path data (path data). At this time, the CPU 201 calculates the path of the robot 103 so that a positional relationship among the camera 105, the light source 102, and a surface (portion to be inspected) WA of the work W satisfy a condition necessary for inspection, by using the above-described three-dimensional shape information of the work W.

At this time, in the case in which the camera 105 and the light source 102 are installed on a same frame, or in the case in which, even though being installed on different frames, the camera 105 and the light source 102 cannot be relatively moved, the calculated inspection path is calculated against the frame. On the other hand, in the case in which the camera 105 and the light source 102 are installed on different frames and the light source 102 can be moved, the path of the light source 102 is independently calculated in the path calculation so as to satisfy the condition necessary for inspection.

Figure 5:
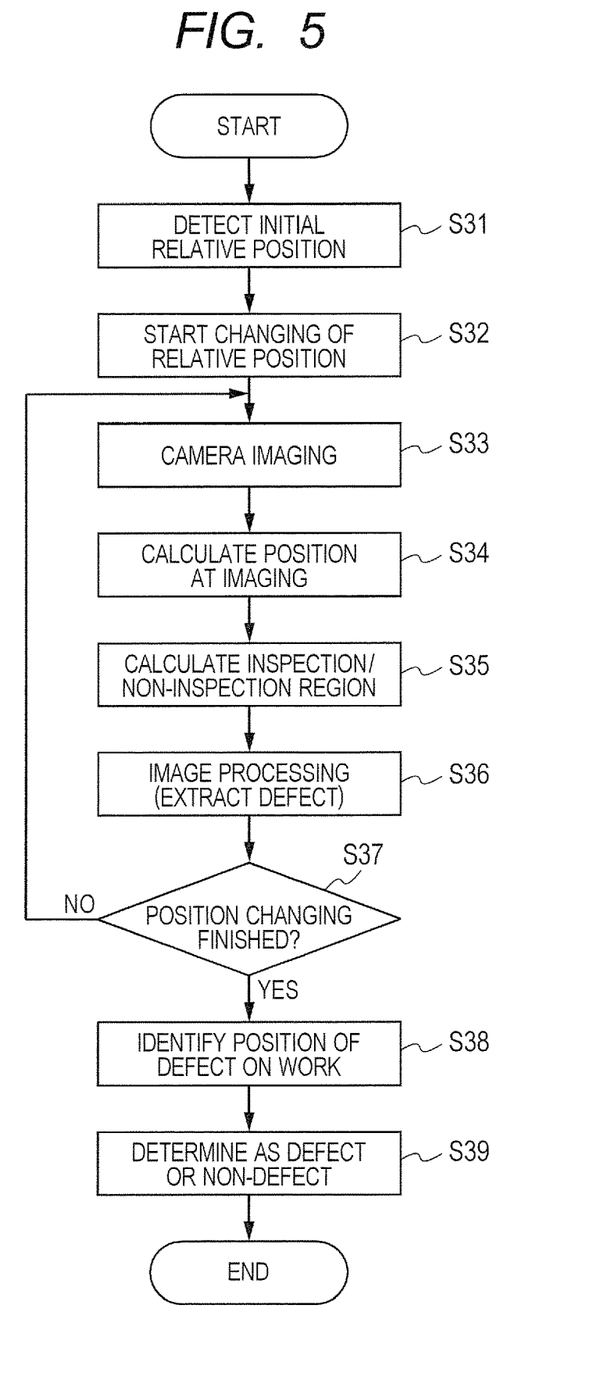
FIG. 5 is a flow chart of the inspection method according to the first embodiment.

FIG. 5 is a flow chart of the inspection method according to the first embodiment of the present invention. In the inspection of the appearance of the work W, there exists such a universal request as to shorten the cycle time needed for the inspection. Then, firstly, the CPU 201 determines the relative position (including the pose) between the camera 105 and the work W at the time when the inspection starts (S31: measuring process and measuring processing). Specifically, the CPU 201 determines the relative position of the work W that is supported by the robot 103 with respect to the camera 105, in the pose of the robot 103, which corresponds to the starting point of the previously set path data. The relative position between the work W and the camera 105 at this time is referred to as an "initial relative position."

Specifically, the CPU 201 extracts a feature point from the picked-up image of the work W, which has been picked up by the camera 105, matches the extracted feature point with the three-dimensional shape information of the work W, and thereby determines the initial relative position. At this time, the CPU 201 considers the information on the position of the robot 103, and thereby can accurately determine the initial relative position even for the work W having a plurality of similar feature points. Thereby, the inspection apparatus does not need to accurately position the work W with respect to the robot in a conventional manner, and can shorten the cycle time necessary for the inspection.

Before performing the calculation of the initial relative position, the CPU 201 needs to calibrate an inner parameter and an outer parameter for the camera 105 (imaging lens 105A) and the robot 103. This calibration is a process of acquiring the position and the pose of the camera 105 and the robot 103 in a global coordinate space, and information on the lens of the imaging lens 105A, and is performed with the use of a plate that is called a calibration plate and of which the pattern arrangement and size are already known. Thereby, the positions and the poses of the camera 105 and the robot 103 in the global coordinate space are adjusted, and the information on the lens of the imaging lens 105A can be acquired. For this reason, the subsequent calculations that include the step S31 are enabled.

Incidentally, a case is described below in which the robot 103 is operated so that the robot 103 becomes the starting point of the path data, in the step S31, but the position is not limited to the starting point. The pose can be arbitrarily set, as long as the pose is a pose in which the camera 105 can pick up an image of the work W. Here, in the first embodiment, the image that has been acquired in the step S31 may be an image that is not used in a subsequent inspection for the work W, and shall be referred to as an image for measuring, which is distinguished from the image for inspection. Specifically, in the step S31, the CPU 201 analyzes the image of the work W for measuring that has been picked up and provided by the camera 105 when the robot 103 has been set at the predetermined pose, and determines the relative position between the work W and the camera 105, at the time when the image for measuring has been picked up.

Next, the CPU 201 operates the robot 103 according to the previously set path data in order to change the relative position between the camera 105 and the work W (S32: moving process and moving processing). In other words, the CPU 201 operates the robot 103 according to the path data, and changes the relative position between the work W and the camera 105.

The CPU 201 makes the camera 105 pick up an image of the work W while relatively moving the work W with respect to the camera 105, and acquires the image for inspection (S33: image acquiring process and image acquiring processing). In other words, the CPU 201 makes the camera 105 pick up an image of the work W while changing the relative position between the work W and the camera 105 in the step S32, and acquires the image. Incidentally, in the first embodiment, the operation of the robot 103 is continued even when the camera 105 picks up the image, but the operation of the robot 103 may be stopped at the imaging timing.

Next, the CPU 201 calculates the relative position between the camera 105 and the work W, at the timing at which the image for inspection is acquired, in other words, at the time when making the camera 105 pick up the image of the work W (S34: position calculating process and position calculating processing). For this purpose, in the first embodiment, the CPU 201 acquires the pose of the robot 103, at the time when the image for inspection is acquired, specifically, a moving amount from the initial position (moving amount with respect to pose of robot 103, at the time when image for measuring has been picked up), from the controlling apparatus 104. Then, the CPU 201 calculates the relative position between the camera 105 and the work W at imaging, from the initial relative position that has been determined in the step S31, and the moving amount from the initial position of the robot 103. Specifically, the CPU 201 analyzes the image for measuring, thereby determines the relative position of the work W to the camera 105, and accordingly determines the relative position of the work W to the robot 103 (robot hand 103B). The relative position between the robot hand 103B of the robot 103 and the work W is constant, and accordingly the relative position of the work W to the camera 105 is determined from the pose of the robot 103 (robot arm 103A) at the time when the pose of the robot 103 has been changed.

Thus, the CPU 201 determines the relative position between the work W and the camera 105, at the time when the image that has been acquired in the step S33 has been picked up, based on the initial relative position that has been determined in the step S31, and on the pose of the robot 103, at the time when the work W has been imaged according to the path data. The pose of the robot 103 at this time may be determined to be a result that has been obtained from a detecting unit (unillustrated) that detects positions of joints of the robot 103, or may be determined to be an instruction value to be sent to each of the joints of the robot 103. Therefore, the CPU 201 can determine the relative position between the camera 105 and the work W from the information sent from the robot 103, even when being incapable of determining the relative position from the picked-up image for inspection.

Next, the CPU 201 calculates the inspection region that corresponds to a portion WA to be inspected of the work W and the non-inspection region other than the inspection region, in the image that has been acquired in the step S33 (S35: inspection region calculating process and inspection region calculating processing). Specifically, the CPU 201 calculates the inspection region that corresponds to the portion WA to be inspected of the work W, in the image that has been acquired in the step S33, based on the relative position between the work W and the camera 105.

The three-dimensional shape information of the work W, and the inspection region and the non-inspection region in the three-dimensional shape information are registered in the HDD 204 in the step S21 and the step S22 in FIG. 3. The CPU 201 calculates the inspection region and the non-inspection region in the image that has been acquired in the step S33, from the registered information and the relative position between the camera 105 and the work W, which has been calculated in the step S34. The CPU 201 can determine the inspection region and the non-inspection region in the image, by perspectively projecting the three-dimensional shape information onto a virtual surface that corresponds to the imaging device 105B of the camera 105.

The imaging lens 105A has a peculiar lens distortion, and deviation occurs between the inspection region that has been calculated by the perspective projection and the inspection region in the image to be actually inspected, by the distortion. Because of this, in the first embodiment, the CPU 201 removes a distortion component from the acquired image, or removes the deviation originating in the lens distortion by adding the distortion component to the inspection region and the non-inspection region.

The inspection region that has been calculated in the step S35 is determined to be a region on the image for inspection, and accordingly, the inspection region can be subjected to image processing such as filter processing and a computation between images, according to the surface state of the work W. In addition, at this time, it is possible not to explicitly subject the non-inspection region that has been calculated in the step S35 to the image processing. Incidentally, in the first embodiment, the case has been described in which the non-inspection region is also calculated in the step S35, but only the inspection region may be configured to be calculated.

The CPU 201 subjects the inspection region that has been calculated in the step S35 to the image processing, determines defect candidates, and extracts a defect from the defect candidates (S36). At this time, the CPU 201 calculates a feature amount of the defect (defect candidate). Specifically, the CPU 201 detects the defect on the inspection region in each of the images in the step S36.

Incidentally, the CPU 201 stores the image for inspection, which has been picked up in the step S33, the relative position between the work W and the camera 105, which has been calculated in the step S34, and the feature amount of the defect, which has been extracted in the step S36, in the HDD 204, in a state in which the above contents are associated with each other.

Next, the CPU 201 determines whether the change in the pose of the robot 103 has ended or not, in other words, whether the operation has been completed or not (S37). When the operation continues (S37: NO), the CPU 201 returns to the step S33 again, and the imaging starts. When the operation is completed (S37: YES), the CPU 201 ends a loop, and performs a next step S38. By this loop operation, the CPU 201 acquires a plurality of images in the step S33, and calculates the inspection region and the non-inspection region in each of the images in the step S35.

The above-described step S33 to step S37 are executed at timing independent of the operation of the robot 103, while the robot 103 operates. Because of this, in the imaging by the camera 105, such an imaging speed needs to be set so that the camera 105 can pick up exhaustively an image of the whole region of the work W or the portion to be inspected. The imaging speed does not need to be the same imaging speed from the start to the end of the inspection, however, and can be changed according to the portion to be inspected. Thereby, an amount of data necessary for the inspection can be also reduced.

Next, the CPU 201 identifies which position on the work W corresponds to the position on the inspection image of the defect that has been detected in the step S36 (S38: identifying process and identifying processing). Specifically, the CPU 201 first detects the defect of the work W from each of the images, in identifying processing (S36), and subsequently, identifies the position of the defect on the work W, based on the relative position between the work W and the camera 105, which has been calculated in the step S34 (S38). This identifying processing is executed with the use of a series of images for inspection, relative positions between the camera 105 and the work W, and feature amounts of the defects, which have been stored in the above-described loop.

The position in the camera coordinate system of the work W, at the time when the image for inspection has been picked up, is determined from the relative position between the camera 105 and the robot 103. The conversion matrix that converts a robot coordinate system into a global coordinate system has been already acquired from the above-described external parameter.

Figure 6:
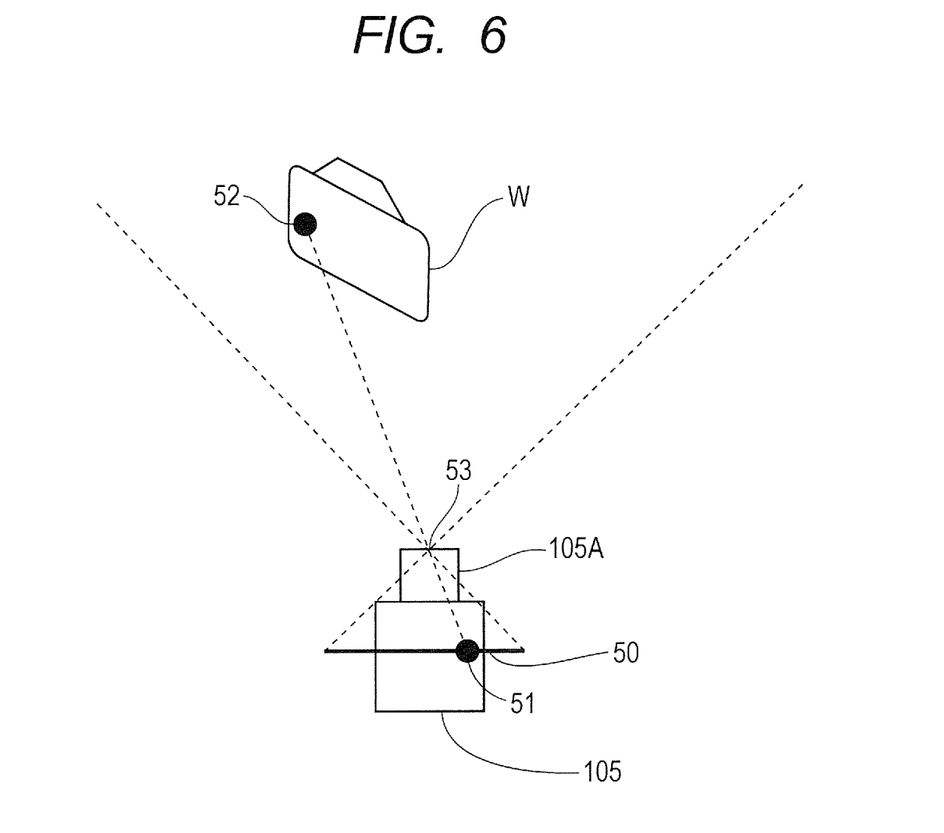
FIG. 6 is a schematic view for describing an identifying process of identifying a position of a defect in the first embodiment.

FIG. 6 is a schematic view for describing an identifying process of identifying the position of the defect in the first embodiment. As is illustrated in FIG. 6, assume a straight line that passes a principal point 53 of the imaging lens 105A from the position of the defect 51 on the image that becomes the image for inspection, which has been detected on the image surface 50. A coordinate system of the straight line is converted into the global coordinate system from a camera coordinate system. Also, as for the work W that is held through the robot coordinate system, the three-dimensional shape information (three-dimensional shape model) can be arranged in the global coordinate system by the conversion matrix. Next, an intersection of the straight line that passes through the principal point 53 of the camera 105 and the three-dimensional shape information that is arranged in the global coordinate system is determined, and thereby a defect position 52 on the work W is identified.

Finally, in the case of the works W having various shapes, it occurs that the determination of whether the work W is a non-defective product or a defective product varies depending on which position on the work W the defect that has actually occurred corresponds to. Then, when the position of the defect on the work W has been identified, the CPU 201 determines the work W as defect or non-defect, based on the position of the defect and the feature amount of the defect (S39).

As described above, the inspection method according to the first embodiment does not need to make the relative position between the work W and the camera 105 coincide with the previously instructed state, in other words, does not need to accurately position the work W to the robot 103. Because of this, a high-speed inspection operation is enabled, and the position of the defect on the work W can be accurately determined. Therefore, the inspection method can accurately determine whether the work W is a non-defective product or a defective product.

Incidentally, the processing of the step S38 does not need to wait for the end of the scanning of the robot 103, and may also be performed between the step S36 and the step S37. In addition, the processing in the step S34 to the step S36 may be performed after the CPU 201 has acquired the plurality of images from the camera 105.

Second Embodiment

Figure 7:
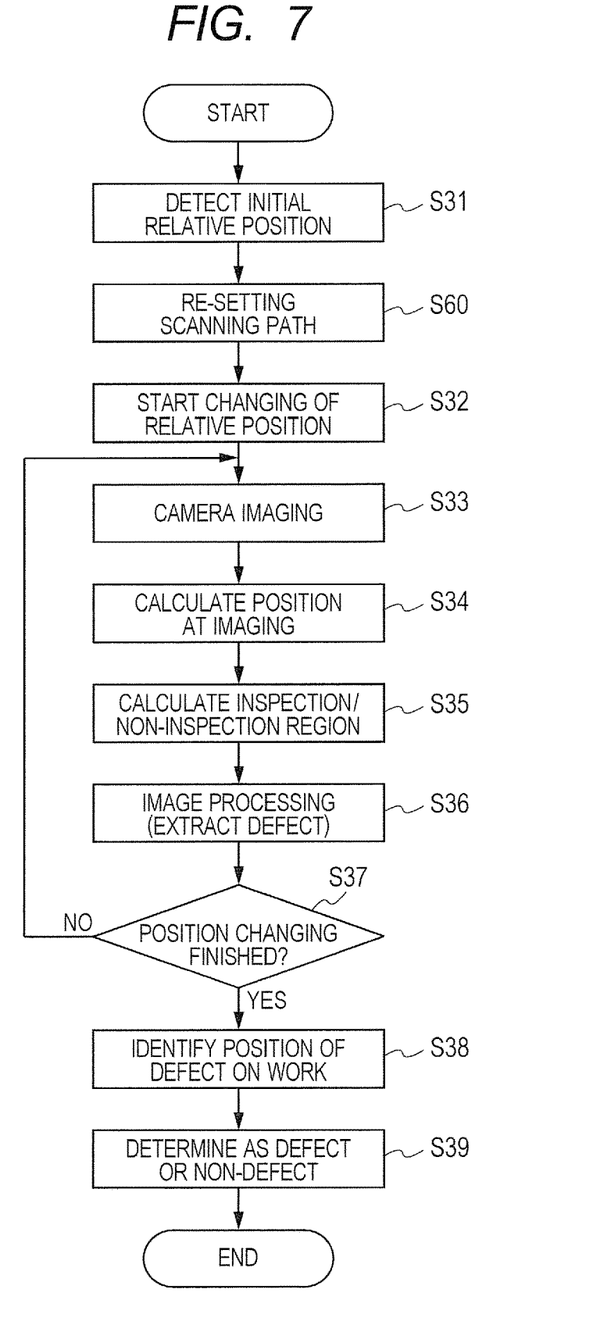
FIG. 7 is a flow chart illustrating an inspection method according to a second embodiment.

Next, an inspection method according to a second embodiment of the present invention will be described. FIG. 7 is a flow chart illustrating the inspection method according to the second embodiment of the present invention. Incidentally, the configuration of the inspection apparatus of the second embodiment is similar to the configuration of the inspection apparatus of the first embodiment, and accordingly the description of the configuration of the inspection apparatus will be omitted. In the second embodiment, the content of the program that is stored in the image processing apparatus of the inspection apparatus is different from that in the first embodiment. Specifically, the inspection method of the second embodiment illustrated in FIG. 7 is an inspection method in which a process (processing) of a step S60 is added to the inspection method of the first embodiment illustrated in FIG. 5, and the steps (processes and processings) other than the step S60 are similar to those in the first embodiment, and the description will be omitted.

When the relative position between the camera 105 and the work W that has been determined in the step S31 is different from the case in which the scanning path (path) of the robot 103 has been set in the flow chart of FIG. 3, it may also occur that the illumination condition necessary for the inspection with the light source 102 cannot be kept.

Because of this, in the step S60 in the second embodiment, the CPU 201 corrects the path to such a path that the relative position between the camera 105 and the work W becomes equal to the position at the time when the path has been set (path re-setting process and path re-setting processing). In other words, prior to the step S32, the CPU 201 corrects the path data so that the work W passes through the predetermined path with respect to the camera 105, in the moving process (in moving processing) of the step S32. Specifically, the CPU 201 corrects the path data based on the relative position between the work W and the camera 105 at the time when the robot 103 has been set at the predetermined pose. Here, the predetermined path is a given path in a three-dimensional space. In addition, the predetermined pose is a previously set particular pose, and is a pose that becomes a starting point in the path data before correction, in the second embodiment. Accordingly, the CPU 201 may correct the path data based on the relative position between the work W and the camera 105, which has been determined in the step S31.

In the second embodiment, the path data is corrected (re-set) prior to the step S32, and accordingly, the controlling apparatus moves the work W so as to pass a path equal to that at the time when the path has been set. By moving the work W in this way, even in the case in which the initial position of the work W has deviated when the inspection has started, the inspection apparatus can perform an inspection equivalent to the inspection at the time when the scanning path has been set, and can enhance the inspection accuracy.

Third Embodiment

Figure 8:
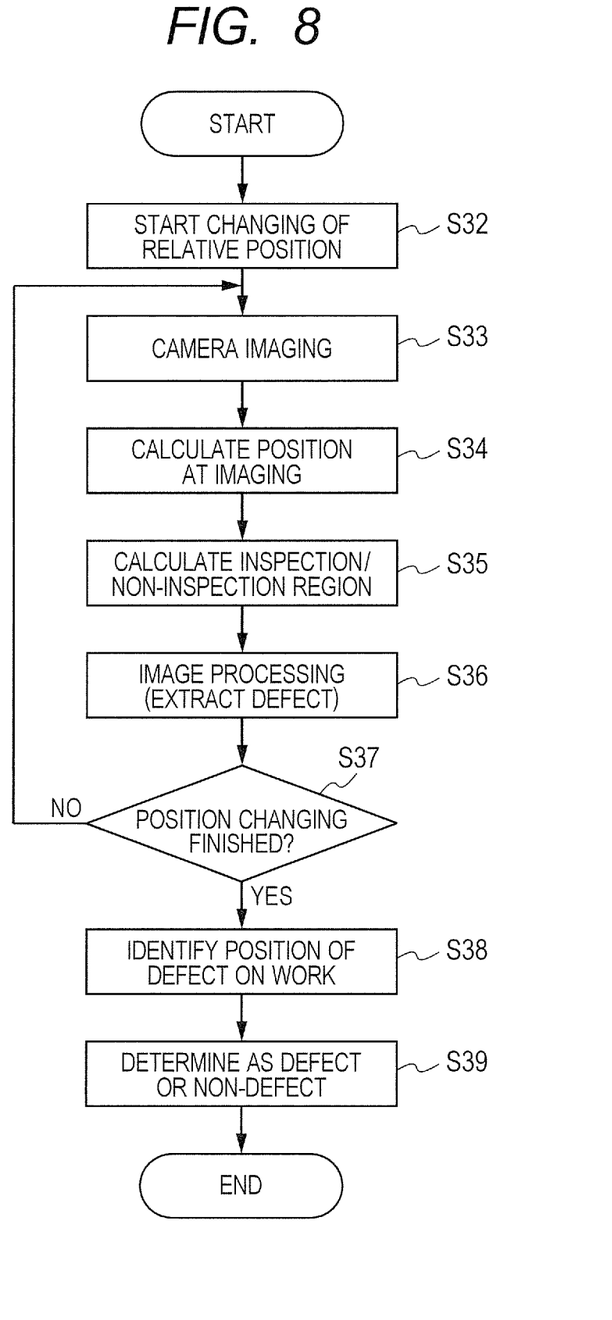
FIG. 8 is a flow chart illustrating an inspection method according to a third embodiment.

Next, an inspection method according to a third embodiment of the present invention will be described. FIG. 8 is a flow chart illustrating the inspection method according to the third embodiment of the present invention. Incidentally, the configuration of the inspection apparatus of the third embodiment is similar to the configuration of the inspection apparatus of the first embodiment, and accordingly, the description of the configuration of the inspection apparatus will be omitted. In the third embodiment, the content of the program that is stored in the image processing apparatus of the inspection apparatus is different from that in the first embodiment. Specifically, the inspection method of the third embodiment illustrated in FIG. 8 is a method in which a process (processing) in the step S31 in the inspection method of the first embodiment illustrated in FIG. 5 is omitted.

Then, the CPU 201 analyzes one image that has been acquired, for instance, in the first loop in the step S33, and determines the relative position between the work W and the camera 105, at the time when this image has been picked up, in the step S34. This computation is similar to that in the step S31 that has been described in the first embodiment. After the next loop, in the step S34, the CPU 201 determines the relative position between the work W and the camera 105, at the time when the acquired image has been picked up, based on the relative position between the work W and the camera 105, which has been determined in the first loop, and on the pose of the robot 103 according to the path data. This computation is similar to that in the step S34 that has been described in the first embodiment.

Also, in the third embodiment, it becomes unnecessary to accurately position the work W to the robot 103, similarly to the first embodiment. Because of this, a high-speed inspection operation is enabled, and the position of the defect on the work W can be accurately determined. Therefore, the inspection method can accurately determine whether the work W is a non-defective product or a defective product.

Incidentally, in the third embodiment, it is acceptable to add the steps S31 and S60, and to re-set the path of the robot 103, similarly to the second embodiment.

Fourth Embodiment

Figure 9:
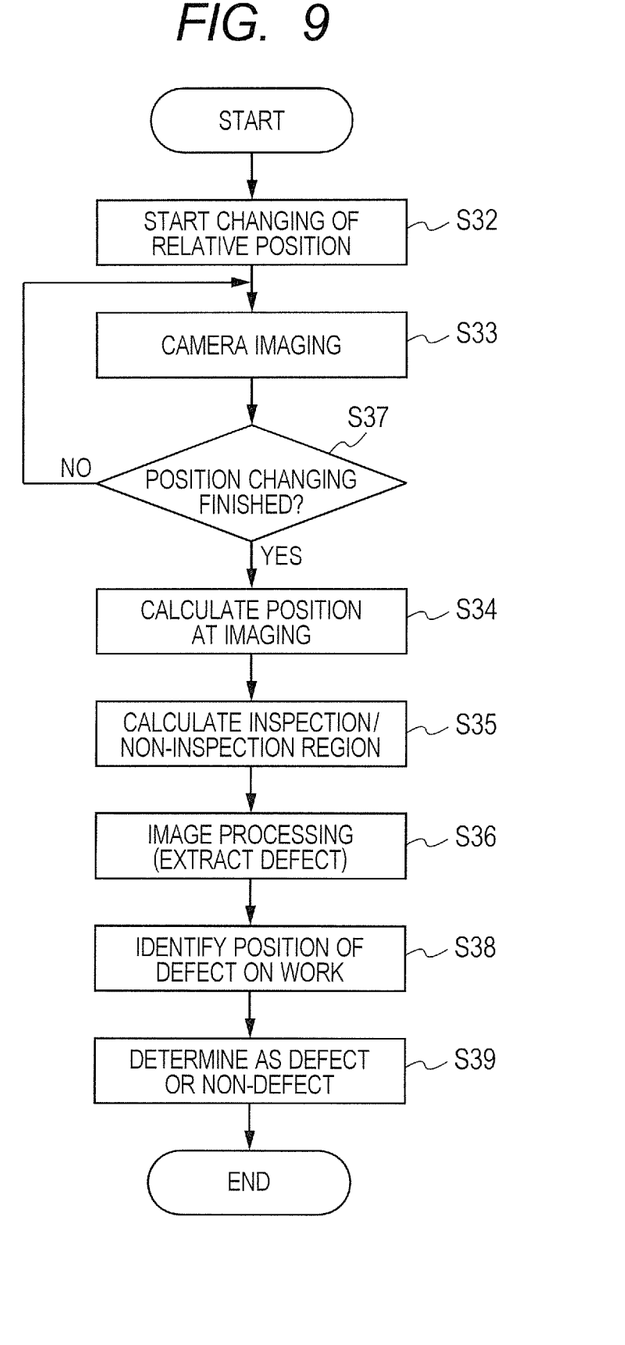
FIG. 9 is a flow chart illustrating an inspection method according to a fourth embodiment.

Next, an inspection method according to a fourth embodiment of the present invention will be described. FIG. 9 is a flow chart illustrating the inspection method according to the fourth embodiment of the present invention. Incidentally, the configuration of the inspection apparatus of the fourth embodiment is similar to the configuration of the inspection apparatus of the first embodiment, and accordingly, the description of the configuration of the inspection apparatus will be omitted. In the fourth embodiment, the content of the program that is stored in the image processing apparatus of the inspection apparatus is different from that in the first embodiment. Specifically, in the inspection method of the fourth embodiment illustrated in FIG. 9, the process (processing) of the step S31 in the inspection method of the first embodiment illustrated in FIG. 5 is omitted, and furthermore, the CPU 201 executes steps S34 to S36 after the processing of the steps S33 and S37, in other words, after having acquired the plurality of images.

Here, in the step S34, after having acquired the plurality of images, the CPU 201 determines the relative position between the work W and the camera 105, at the time when the image has been picked up. If described in detail, the CPU 201 analyzes one image among the plurality of images, which is not limited to the first image, and determines the relative position between the work W and the camera 105, at the time when this image has been picked up. This computation is similar to that in the step S31 that has been described in the first embodiment. Then, the CPU 201 determines the relative position between the work W and the camera 105, at the time when remaining images among the plurality of images have been picked up, based on the relative position between the work W and the camera 105, at the time when the one image has been picked up, and based on the pose of the robot 103 according to the path data. The pose of the robot 103 at this time is a relative moving amount to the pose of the robot 103, at the time when the one image among the plurality of images has been picked up. This computation is similar to that in the step S34 that has been described in the first embodiment.

Incidentally, in the fourth embodiment, it is acceptable to add the steps S31 and S60, and to re-set the path of the robot 103, similarly to the second embodiment.

In addition, it is acceptable to determine the relative position between the work W and the camera 105, at the time when the image has been picked up, for all of the images, by similar arithmetic processing to that in the step S31 that has been described in the first embodiment. Specifically, in the calculating processing of the relative position between the camera 105 and the work W in the step S34 in FIG. 5 and FIG. 7 in the first and second embodiments, the position of the work W can also be utilized, which has been detected from the picked-up image for inspection. In other words, the CPU 201 may analyze each of the plurality of images which the CPU 201 has acquired in the image acquiring process, and may determine the relative position between the work W and the camera 105, in the step S34.

For this purpose, it is necessary to set feature points that can be matched with the three-dimensional shape information, in a plurality of positions (including poses) of the work W. The set feature points are matched with the picked-up inspection image, and thereby the position of the work W at imaging can be determined. By utilizing the position of the work W that has been determined in this way, the inspection method can further enhance the accuracy than the method of determining the relative position between the camera 105 and the work W only from the information of the robot 103. Thereby, the calculation accuracy for the position of the defect on the inspection region and the work W is enhanced, and accordingly, the inspection method can more accurately determine whether the work W is a non-defective product or a defective product.

In addition, there may be mixed cases of the case in which the relative position between the work W and the camera 105 is determined from the pose of the robot 103, and the case in which the relative position between the work W and the camera 105 is determined from the image for inspection. Therefore, even when the relative position between the work W and the camera 105 cannot be determined in all of the images for inspection, the relative position between the work W and the camera 105 can be determined from the pose of the robot 103.

Incidentally, the present invention is not limited to the above-described embodiments, but can be variously modified within a technological idea of the present invention. In addition, in regard to the effects that have been described in the embodiments of the present invention, the most suitable effects that are created by the present invention are merely enumerated, and the effects according to the present invention are not limited to the effects that have been described in the embodiments of the present invention.

Other Embodiment(s)

Embodiment(s) of the present invention can also be realized by a computer of a system or an apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)), and may include a network of separate computers or separate processors to read out and to execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

In addition, in the above-described embodiments, the case has been described in which the robot arm is a vertical multi-joint robot arm, but the robot arm is not limited to the vertical multi-joint robot arm. The robot arm may be various robot arms, for instance, such as a horizontal multi-joint robot arm, a parallel link robot arm, and an orthogonal robot.

In addition, in the above-described embodiments, the case has been described in which the processing unit is the CPU 201 of the image processing apparatus 200, but the processing unit is not limited to the CPU 201. The processing unit may be a CPU of the controlling apparatus 104, a CPU of another apparatus, or may be configured of a plurality of CPUs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An inspection method in which a processing unit controls imaging timing of an imaging apparatus that picks up an image of a work, controls an operation of a moving apparatus for moving at least one of the work and the imaging apparatus, and inspects the work based on an imaging result of the imaging apparatus, the inspection method comprising:

a moving process in which the processing unit makes the moving apparatus operate according to path data, and changes a relative position between the work and the imaging apparatus;

an image acquiring process in which the processing unit makes the imaging apparatus pick up, at a plurality of imaging times, the image of a same inspection region of the work, while changing the relative position between the work and the imaging apparatus in the moving process, and acquires a plurality of images;

a position calculating process in which the processing unit determines the relative position between the work and the imaging apparatus, at each imaging time, of the plurality of imaging times, when having made the imaging apparatus pick up, at the plurality of imaging times, the image of the work; and an identifying process in which the processing unit inspects, at a plurality of inspection times, the same inspection region of the work from each of the images, and identifies, in response to detection of a defect in the inspection region, a position of the defect in the work, based on the relative position between the work and the imaging apparatus at a time of picking up the image during which the defect is detected.

2. The inspection method according to claim 1, wherein, in the position calculating process, the processing unit analyzes one image, among the plurality of images, and determines the relative position between the work and the imaging apparatus, at the time when the image has been picked up, and determines relative positions between the work and the imaging apparatus, at the time when remaining images, of the plurality of images, have been picked up, based on the relative position between the work and the imaging apparatus, at the time when the one image has been picked up, and based on a pose of the moving apparatus according to the path data.

3. The inspection method according to claim 2, wherein the pose of the moving apparatus is a moving amount with respect to the pose of the moving apparatus, at the time when the one image has been picked up.

4. The inspection method according to claim 1, further comprising a measuring process in which the processing unit analyzes an image for measuring, which has been obtained when the imaging apparatus has picked up the image of the work, when the moving apparatus has been set at a predetermined pose, and determines a relative position between the work and the imaging apparatus, at the time when the image for measuring has been picked up, wherein, in the position calculating process, the processing unit determines the relative position between the work and the imaging apparatus, at the time when each of the images, of the plurality of images, has been picked up during the image acquiring process, based on the relative position between the work and the imaging apparatus, at the time when the image for measuring has been picked up, that has been determined in the measuring process, and based on a pose of the moving apparatus according to the path data.

5. The inspection method according to claim 4, wherein the pose of the moving apparatus is a moving amount with respect to the pose of the moving apparatus, at the time when the image for measuring has been picked up.

6. The inspection method according to claim 1, wherein, in the position calculating process, the processing unit analyzes each of the plurality of images that have been acquired in the image acquiring process, and determines the relative position between the work and the imaging apparatus.

7. The inspection method according to claim 1, further comprising an inspection region calculating process in which the processing unit calculates an inspection region corresponding to a portion to be inspected of the work in each of the images of the plurality of images, based on the relative position between the work and the imaging apparatus,
wherein, in the identifying process, the processing unit detects the defect in the inspection region in each of the images, of the plurality of images.

8. The inspection method according to claim 1, further comprising a path re-setting process in which the processing unit corrects the path data so that the work follows a predetermined path with respect to the imaging apparatus at the time of the moving process, prior to the moving process, based on the relative position between the work and the imaging apparatus at the time when the moving apparatus has been set at a predetermined pose.

9. The inspection method according to claim 1, wherein the moving apparatus is a robot having:
(a) a robot arm; and
(b) a robot hand that is attached to the robot arm, and that grasps the work.

10. An inspection apparatus comprising:
(a) an imaging apparatus that picks up an image of a work;
(b) a moving apparatus for moving at least one of the work and the imaging apparatus; and
(c) a processing unit that controls imaging timing of the imaging apparatus and an operation of the moving apparatus, and inspects the work based on an imaging result of the imaging apparatus, wherein the processing unit executes:
(i) moving processing of making the moving apparatus operate according to path data, and changing a relative position between the work and the imaging apparatus;
(ii) image acquiring processing of making the imaging apparatus pick up, at a plurality of imaging times, the image of a same inspection region of the work, while changing the relative position between the work and the imaging apparatus in the moving processing, and acquiring a plurality of images;
(iii) position calculating processing of determining the relative position between the work and the imaging apparatus, at each imaging time, of the plurality of imaging times, when having made the imaging apparatus pick up, at the plurality of imaging times, the image of the work; and
(iv) identifying processing of inspecting, at a plurality of inspection times, the same inspection region of the work from each of the images, and identifying, in response to detection of a defect in the inspection region, a position of the defect, based on the relative position between the work and the imaging apparatus at a time of picking up the image during which the defect is detected.

11. The inspection apparatus according to claim 10, wherein, in the position calculating processing, the processing unit analyzes one image, among the plurality of images, and determines the relative position between the work and the imaging apparatus, at the time when the image has been picked up, and determines relative positions between the work and the imaging apparatus, at the time when remaining images, of the plurality of images, have been picked up, based on the relative position between the work and the imaging apparatus, at the time when the one image has been picked up, and based on a pose of the moving apparatus according to the path data.

12. The inspection apparatus according to claim 11, wherein the pose of the moving apparatus is a moving amount with respect to the pose of the moving apparatus, at the time when the one image has been picked up.

13. The inspection apparatus according to claim 10, wherein the processing unit further executes measuring processing of analyzing an image for measuring, which has been obtained when the imaging apparatus has picked up the image of the work, when the moving apparatus has been set at a predetermined pose, and determining a relative position between the work and the imaging apparatus, at the time when the image for measuring has been picked up, and
wherein, in the position calculating processing, determines the relative position between the work and the imaging apparatus, at the time when each of the images, of the plurality of images, has been picked up during the image acquiring processing, based on the relative position between the work and the imaging apparatus, at the time when the image for measuring has been picked up, that has been determined in the measuring processing, and based on a pose of the moving apparatus according to the path data.

14. The inspection apparatus according to claim 13, wherein the pose of the moving apparatus is a moving amount with respect to the pose of the moving apparatus, at the time when the image for measuring has been picked up.

15. The inspection apparatus according to claim 10, wherein, in the position calculating processing, the processing unit analyzes each of the plurality of images that have been acquired in the image acquiring processing, and determines the relative position between the work and the imaging apparatus.

16. The inspection apparatus according to claim 10, wherein the processing unit further executes inspection region calculating processing of calculating an inspection region corresponding to a portion to be inspected of the work in each of the images, of the plurality of images, based on the relative position between the work and the imaging apparatus, and, in the identifying processing, detects the defect in the inspection region in each of the images, of the plurality of images.

17. The inspection apparatus according to claim 10, wherein the processing unit further executes path re-setting processing of correcting the path data so that the work follows a predetermined path with respect to the imaging apparatus in the moving processing, prior to the moving processing, based on the relative position between the work and the imaging apparatus, at the time when the moving apparatus has been set at a predetermined pose.

18. The inspection apparatus according to claim 10, wherein the moving apparatus is a robot having:
(a) a robot arm; and (b) a robot hand that is attached to the robot arm, and that grasps the work.

19. A processing apparatus comprising:
a processing unit that controls imaging timing of an imaging apparatus that picks up an image of a work, controls an operation of a moving apparatus for moving at least one of the work and the imaging apparatus, and inspects the work based on an imaging result of the imaging apparatus, wherein the processing unit executes:
  (a) moving processing of making the moving apparatus operate according to path data, and changing a relative position between the work and the imaging apparatus;
  (b) image acquiring processing of making the imaging apparatus pick up, at a plurality of imaging times, the image of a same inspection region of the work, while changing the relative position between the work and the imaging apparatus in the moving processing, and acquiring a plurality of images;
  (c) position calculating processing of determining the relative position between the work and the imaging apparatus, at each imaging time, of the plurality of imaging times, when having made the imaging apparatus pick up, at the plurality of imaging times, the image of the work; and
  (d) identifying processing of inspecting, at a plurality of inspection times, the same inspection region of the work from each of the images, and identifying, in response to detection of a defect in the inspection region, a position of the defect, based on the relative position between the work and the imaging apparatus at a time of picking up the image during which the defect is detected.

20. A non-transitory computer-readable recording medium storing a readable program for operating a computer to execute an inspection method in which a processing unit controls imaging timing of an imaging apparatus that picks up an image of a work, controls an operation of a moving apparatus for moving at least one of the work and the imaging apparatus, and inspects the work based on an imaging result of the imaging apparatus, the inspection method comprising:
a moving process in which the processing unit makes the moving apparatus operate according to path data, and changes a relative position between the work and the imaging apparatus;
an image acquiring process in which the processing unit makes the imaging apparatus pick up, at a plurality of imaging times, the image of a same inspection region of the work, while changing the relative position between the work and the imaging apparatus in the moving process, and acquires a plurality of images;
a position calculating process in which the processing unit determines the relative position between the work and the imaging apparatus, at each imaging time, of the plurality of imaging times, when having made the imaging apparatus pick up, at the plurality of imaging times, the image of the work; and
an identifying process in which the processing unit inspects, at a plurality of inspection times, the same inspection region of the work from each of the images, and identifies, in response to detection of a defect in the inspection region, a position of the defect in the work, based on the relative position between the work and the imaging apparatus at a time of picking up the image during which the defect is detected.

* * * * *